United States Patent [19]

Shimizu

[11] Patent Number: 4,675,533
[45] Date of Patent: Jun. 23, 1987

[54] IMAGE READING APPARATUS WITH IMAGE DATA OVERLAP REMOVAL

[75] Inventor: Katsuichi Shimizu, Kunitachi, Japan

[73] Assignee: Canon Kabushiki Kaisha, Tokyo, Japan

[21] Appl. No.: 513,841

[22] Filed: Jul. 14, 1983

[30] Foreign Application Priority Data

Jul. 22, 1982 [JP] Japan .............................. 57-128073
Jul. 22, 1982 [JP] Japan .............................. 57-128074
Jul. 22, 1982 [JP] Japan .............................. 57-128075

[51] Int. Cl.⁴ ............................................. H01J 40/14
[52] U.S. Cl. .................................... 250/578; 358/293
[58] Field of Search ...................... 250/578, 208, 209; 358/212, 213, 293, 294, 163

[56] References Cited

U.S. PATENT DOCUMENTS

| | | | |
|---|---|---|---|
| 4,146,786 | 3/1979 | Agulnek | 250/578 |
| 4,314,281 | 2/1982 | Wiggins | 358/163 |
| 4,358,794 | 11/1982 | Kurakami | 358/293 |
| 4,439,790 | 3/1984 | Yoshida | 358/256 |
| 4,449,151 | 5/1984 | Yokoda | 358/293 |
| 4,465,939 | 8/1984 | Tamura | 250/578 |

Primary Examiner—David C. Nelms
Attorney, Agent, or Firm—Fitzpatrick, Cella, Harper & Scinto

[57] ABSTRACT

An image reading apparatus has a number of image sensors, a shading correction circuit, a linking circuit, and a CPU. The shading correction circuit has a RAM, a multiplication ROM, an address comparator, and a selector for correcting each pixel output. The linking circuit has shift memories for storing one-line image signals from the image sensors. The CPU controls addressing of the shift memories by means of address selectors and read/write counters. An image signal corresponding to a marker for linking output signals from the image sensors is replaced by an immediately preceding image signal. The adverse effect on shading correction of the marker for such linking is eliminated.

19 Claims, 15 Drawing Figures

IMAGE READING APPARATUS WITH IMAGE DATA OVERLAP REMOVAL

BACKGROUND OF THE INVENTION

1. Field of the Invention

The present invention relates to an image reading apparatus which reads an image by means of an image pickup device and produces an image signal.

2. Description of the Prior Art

In an image reading apparatus for use in a digital copier, a facsimile system, an image file or the like, an original carrying an image, characters or any other type of information is irradiated with light from a rod-shaped light source. Reflected light from the original is received by a solid-state image sensor through an imaging lens so as to convert the original information into an electric signal. In an apparatus of this type, shading characteristics must be corrected. Shading characteristics are caused by: nonuniform illumination characteristics of the light source, contamination of a reflector, a decrease in the F-number of a lens toward its periphery in accordance with the so-called $\cos^4 \theta$ characteristics (where $\theta$ is the half field angle of the lens), and variations in sensitivity between bits of the image sensor. It has been proposed to perform such shading correction in accordance with a signal obtained upon reception of reflected light from a white board as a standard for shading correction.

Meanwhile, in an image reading apparatus of the type described above, it has also been proposed to arrange a plurality of image sensors along the scanning direction so as to improve resolution and transfer speed. In this case, an optically noncontinuous region may not be formed between regions which are scanned by the respective image sensors. Thus, overlap regions are formed at the peripheries of regions scanned by the respective image sensors, which overlap regions are scanned by more than one image sensor. A reference marker is placed in each such overlap region. In response to a signal corresponding to each such reference marker, outputs from the image sensors are linked together for continuity.

When such linking is performed in accordance with a signal corresponding to a reference marker, calculation of the linking amount may involve an error which is attributable to the shading characteristics mentioned above. Such an error must be eliminated.

When these means are actually adopted in an image reading apparatus, these means are preferably assembled in the apparatus with a simple construction and without mutual interference.

SUMMARY OF THE INVENTION

The present invention has been made in consideration of this situation and has for its object to provide an image reading apparatus which allows faithful reading of an image.

It is another object of the present invention to provide an image reading apparatus which eliminates the adverse effects of normal binary encoding of an image and which thus provides desirable binary signals.

It is still another object of the present invention to provide an image reading apparatus which performs at a proper timing processing such as removal of an unnecessary portion of the read image.

It is still another object of the present invention to provide an image reading apparatus having linking means for linking outputs from a plurality of image pickup devices, wherein an error in the linking processing which is conventionally caused by the shading characteristics is prevented.

It is still another object of the present invention to provide an image reading apparatus having shading correcting means and linking means for linking outputs from a plurality of image pickup devices, wherein shading correction is performed first, and then calculation of the linking amount is performed on the basis of the signal which has been subjected to shading correction.

It is still another object of the present invention to provide an image reading apparatus having shading correcting means and linking means for linking outputs from a plurality of image pickup devices, wherein an influence of a marker portion for facilitating linking of the outputs from the image pickup devices may be avoided in shading correction by means of a simple circuit configuration and without requiring highly precise position control of a light source.

The above and other objects and advantages of the present invention will become apparent from the following description taken in conjunction with the accompanying drawings.

DETAILED DESCRIPTION OF THE PREFERRED EMBODIMENTS

Figure 1A:
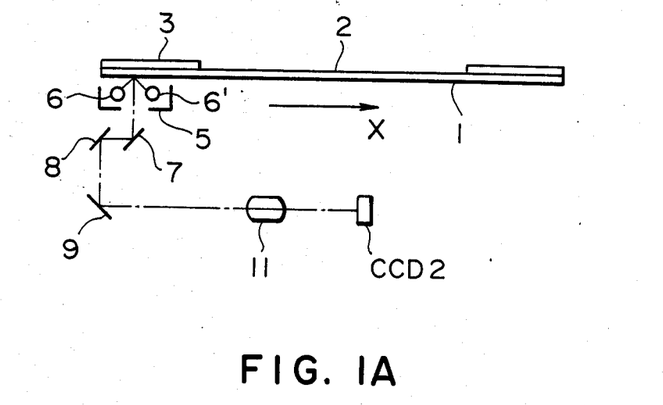
FIG. 1(A) is a side view of an image reading apparatus according to a first embodiment of the present invention.
Figure 1B:
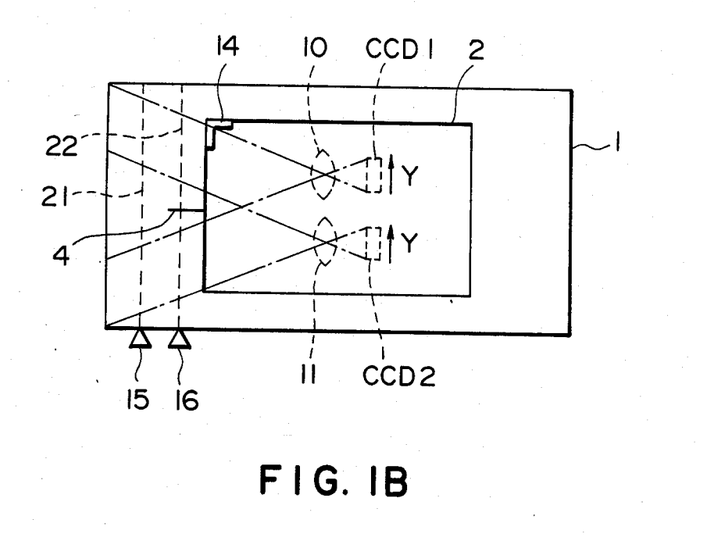
FIG. 1(B) is a plan view thereof.

FIG. 1(A) is a side view of an image reading apparatus according to the first embodiment of the present invention, and FIG. 1(B) is a plan view thereof for explaining its mode of operation.

An image to be read by an image reading apparatus of the present invention includes information included in a document, a photograph, a map, a figure or a table carrying an image, characters, symbols and so on thereon, as well as information such as a pattern of a flat material such as a textile or an article made therefrom. A carrier of such information will be referred to as an original hereinafter throughout this specification. Referring to FIGS. 1(A) and 1(B), an original table 1 comprising a glass table has a main scanning region 2. A reference optical characteristic portion 3 is arranged to be either stationary or movable relative to the original table 1 or is placed at a predetermined position on the table 1. Throughout the specification, the assembly of the reference optical characteristic portion 3 and a marker portion 4 to be described later is referred to as an arrangement. In the first embodiment, the surface of the reference optical characteristic portion 3 which is in contact with the original table 1 is a white board. The position of the reference optical characteristic portion 3 corresponds to a first home position 21 of a light source unit 5 where the unit 5 is held stationary. The characteristics of the reference optical characteristic portion 3 which influence the reflected light therefrom, such as hue, reflectance, or surface smoothness, provide a reference for shading correction. The marker portion 4 is also located on the original table 1 so as to provide an additional reference to the reference provided by the reference optical characteristic portion 3. In this embodiment, the part of the marker portion 4 which is in contact with the original table 1 is a black line. Thus, light emitted by the light source unit 5 and reflected from the marker portion 4 is converted to a signal for use in linking processing, which will be described later. The position of the marker portion 4 is determined to be outside the main scanning region and such that light reflected by the marker portion 4 may not be picked up by image pickup devices when the reference optical characteristic portion 3 is irradiated with light from the light source unit 5 at the first home position 21. The position of the marker portion 4 is further determined such that the marker portion 4 may be scanned by two adjacent optical systems which include lenses 10 and 11, respectively.

The light source unit 5 has rod-shaped light sources 6 and 6'. At the first home position 21, the light source unit 5 irradiates the entire region of the reference optical characteristic portion 3 in the main scanning direction (direction along dotted line 21 shown in FIG. 1(B)). At a second home position 22, the light source unit 5 irradiates the marker portion 4. When the marker portion 4 is irradiated with light, the portion adjacent to the marker portion 4 in at least the main scanning direction must be irradiated. In the general case, the light source unit 5 at the second home position 22 irradiates the entire region including the marker portion 4 extending in the main scanning direction. The light source unit 5 further moves in the subscanning direction (direction X in FIG. 1(A)) so as to scan the entire region of an original placed on the main scanning region 2. Reflectors 7, 8 and 9 are moved such that the optical paths from a point irradiated with light from the light source unit 5 to the lenses 10 and 11 are kept constant. More specifically, the reflector 7 moves together with the light source unit 5, while the reflectors 8 and 9 move for a distance having a predetermined ratio to the distance moved by the light source unit 5 so as to satisfy the above condition. The lenses 10 and 11 are imaging lenses. When the portion including the reference optical characteristic portion 3 and the marker portion 4 and the original on the main scanning region 2 are irradiated with light from the light source unit 5, the imaging lenses 10 and 11 deflect the reflected light to the light-receiving surfaces of the image pickup devices through the reflectors 7 to 9 (omitted for illustrative convenience in FIG. 1(B). Solid-state image sensors CCD1 and CCD2 as image pickup devices may comprise charge-coupled devices, MOS transistors or the like. The image sensors CCD1 and CCD2 electrically scan in the main scanning direction. Referring to FIG. 1(B), a reference mark 14 provides a reference for placement of an original on the original table. Sensors 15 and 16 respectively detect the position of the light source unit 5 at the first and second home positions 21 and 22. The position of the light source unit 5 is adjusted through a control mechanism (not shown) in accordance with outputs from these sensors 15 and 16.

The mode of operation of the apparatus as shown in FIG. 1 will now be described. In the stationary state, the light source unit 5 is at its first home position 21. In the initial period of operation, the light source unit 5 irradiates the reference optical characteristic portion 3. Light reflected from the reference optical characteristic portion 3 is received by the image sensors CCD1 and CCD2 through the reflectors 7, 8 and 9 and the imaging lenses 10 and 11. The image sensors CCD1 and CCD2 then produce output signals which represent the shading characteristics. The characteristics of the light source unit 5 and the distance between the first and second home positions 21 and 22 are determined such that the marker portion 4 may not coincide with a main scanning line. The signals representing the shading characteristics and produced from the image sensors CCD1 and CCD2 are used for shading correction, as will be described later with reference to FIG. 3. Subsequently, at the second home position 22, the light source unit 5 irradiates the portion including the marker portion 4. Light reflected from such a portion is received by the image sensors CCD1 and CCD2 as in the case described above. Calculation of the linking amount is performed on the basis of the output signals from the image sensors CCD1 and CCD2. Details of this operation will also be described with reference to FIGS. 4 to 6. As for the sequence, shading correction is performed first and calculation of linking amount is performed next. This is attributed to the following reason. If a correct shading value is not calculated, a read value of the marker portion 4 (thin black line) includes an error. Then, the light source unit 5 moves to the main scanning region 2 and advances in the subscanning direction (X direction) in FIG. 1(A) so as to scan the original in both the main scanning and subscanning directions. Read signals of the original are produced from the image sensors CCD1 and CCD2 and are processed by the circuits to be described later and shown in FIGS. 3 and 5. When scanning of the original is completed, the light source unit 5 returns to the first home position 21.

An image reading apparatus according to the second embodiment of the present invention will now be described.

Figure 2A:
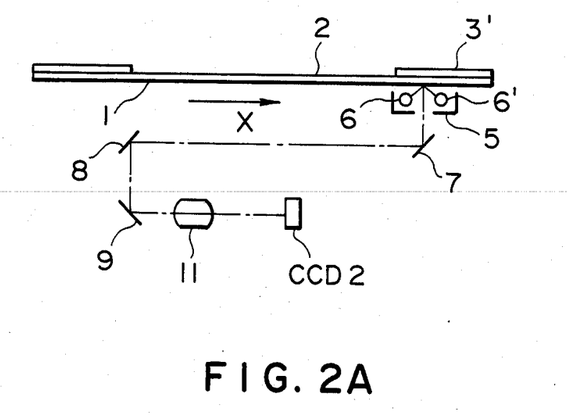
FIG. 2(A) is a side view of an image reading apparatus according to a second embodiment of the present invention.
Figure 2B:
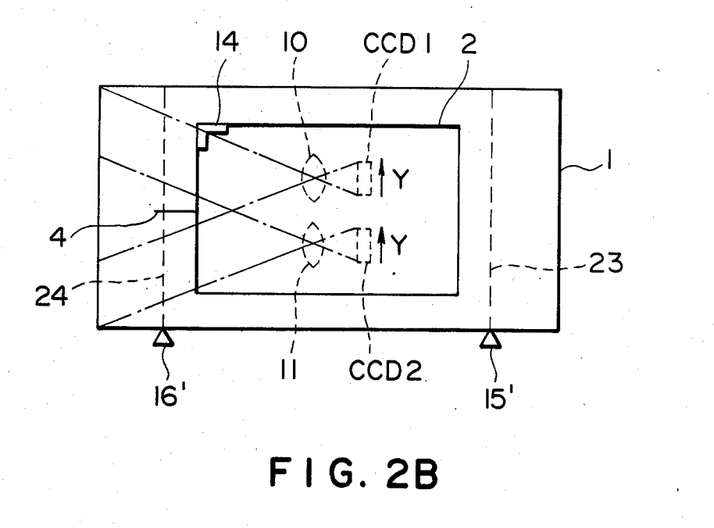
FIG. 2(B) is a plan view thereof.

FIGS. 2(A) and 2(B) are a side view and a plan view, respectively, of the image reading apparatus according to the second embodiment of the present invention. The second embodiment is different from the first embodiment in that a reference optical characteristic portion 3' is arranged at the opposite side from a marker portion 4 with respect to a main scanning region 2. A light source unit 5 has first and second home positions 23 and 24, respectively. Sensors 15' and 16' detect the light source unit 5 at its first and second home positions 23 and 24, respectively. These parts of the apparatus of the second embodiment function in the same manner as those of the first embodiment shown as used in FIG. 1. The same reference numerals in FIG. 1 denote the same parts in FIG. 2, and have basically the same configurations and functions.

In the apparatus shown in FIG. 2, in the stationary state, the light source unit 5 is located at its first home position 23. In the initial period of its operation, the light source unit 5 irradiates the reference optical characteristic portion 3', and solid-state image sensors CCD1 and CCD2 produce signals which represent shading characteristics. Next, the light source unit 5 moves in the opposite direction to that designated by X in FIG. 2(A) to reach the second home position 24. The portion including the marker portion 4 is irradiated with light from the light source unit 5, and signals for linking are obtained. Thereafter, the light source unit 5 moves in the X direction to scan the original. When scanning of the original is completed, the light source unit 5 returns to the first home position 23.

In the second embodiment described above, the reference optical characteristic portion 3' is arranged opposite to the marker portion 4 with respect to the main scanning region 2. Therefore, control of the position of the light source unit 5 is easier than in the first embodiment. For example, in the first embodiment shown in FIG. 1, when the reference optical characteristic portion 3 is irradiated with light from the light source unit 5 at its first home position 21, the reflected light from the marker portion 4 is not received by the image sensors CCD1 and CCD2. Furthermore, the light source unit 5 is moved for a small distance toward the home position 22, and the reflectors 7 to 9 are also moved. Accordingly, relatively precise position control is required. However, in the second embodiment, since the reference optical characteristic portion 3' and the marker portion 4 are at separate positions, precision requirements for control of the optical characteristics of the light source unit 5 and position control of the light source unit 5 and the reflectors 7 to 9 are moderated.

The apparatuses shown in FIGS. 1 and 2 can perform shading correction, linking of the outputs from a plurality of image pickup devices and reading of the original by simply moving the light source unit.

Shading correction will now be described with reference to FIG. 3.

Figure 3:
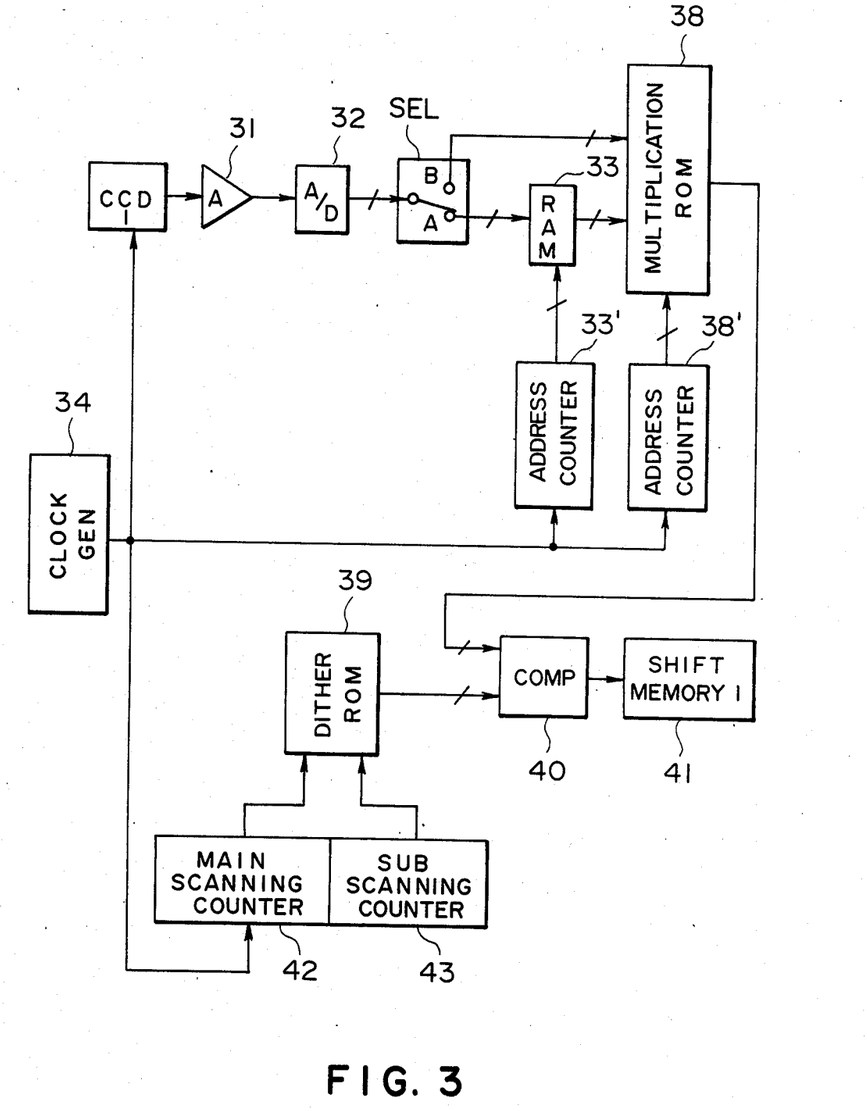
FIG. 3 is a block diagram of a shading correction circuit of the apparatus shown in FIG. 2.

FIG. 3 shows a block diagram of a shading correction circuit and shows only the parts for processing outputs from one image sensor CCD1. Referring to FIG. 3, in the initial period of shading correction, a selector SEL is switched to the side of a contact A. A bit-serial image signal from the image sensor CCD1 is amplified by an amplifier 31, an output signal from which is converted to a digital signal by an A/D converter 32. The digital signal from the A/D converter 32 is writtern in a random-access memory (to be referred to as a RAM hereinafter) 33. Address control of the RAM 33 is performed through an address counter 33' in accordance with a clock signal synchronous with a clock signal from a clock generator 34 corresponding to the image sensor CCD1. Sampled values of the outputs from the image sensor CCD1 may be written in the RAM 33 as typical values. In the periods for scanning the portion including the marker portion 4 and scanning the original, the selector SEL is switched to the side of a contact B. Image data corresponding to the portion including the marker 4 and also to the original is supplied to one input end of a multiplication read-only memory (to be referred to as ROM hereinafter) 38. The other input end of the multiplication ROM 38 receives a signal from the RAM 33 including the sampled shading values obtained in the shading sequence described above. Address control of the multiplication ROM 38 is performed through an address counter 38' in accordance with a clock signal synchronous with a clock signal from the clock generator 34. When an input from the RAM 33 is n and the image data is m, the multiplication ROM 38 produces a code m/n using these values m and n as addresses. The respective pixel outputs are corrected in accordance with this output code so as to perform shading correction. An output from the multiplication ROM 38 is supplied to a comparator 40, and is compared with a threshold output for halftone image reproduction which is received from a dither ROM 39 as a threshold determination circuit. Binary image data from the comparator 40 is supplied to a shift memory 41. A signal synchronous with a clock signal from the clock generator 34 is supplied to a main scanning counter 42. Every time the count of the main scanning counter 42 reaches a predetermined value, a count pulse is supplied to a subscanning counter 43 for synchronizing the address control with the subscanning operation of the light source unit 5.

Figure 4:
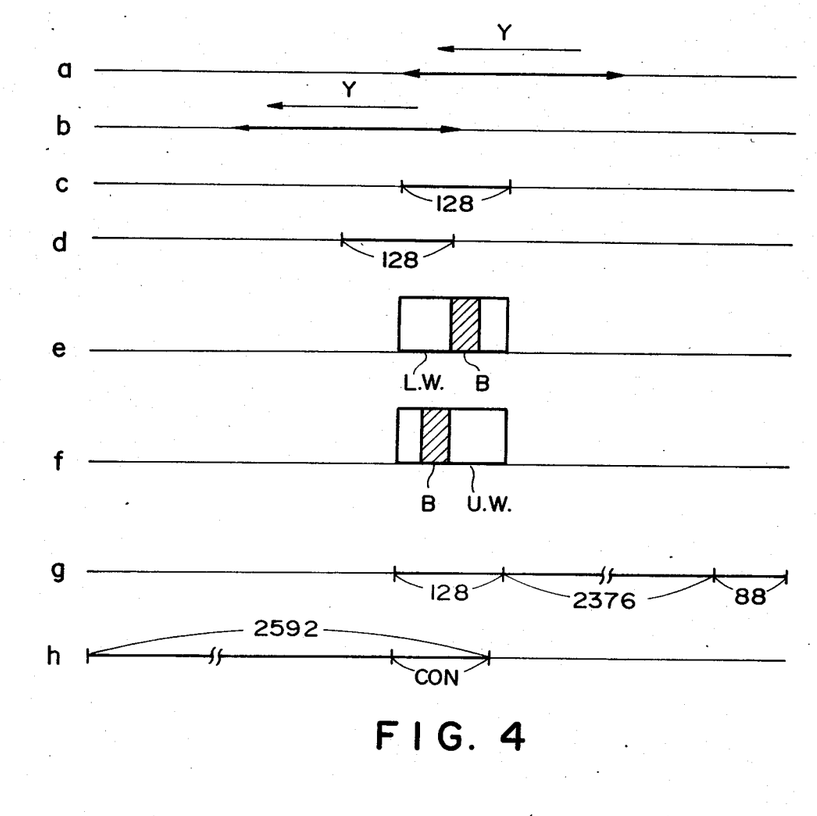
FIG. 4 is a representation for explaining the principle of the linking processing of outputs from a plurality of image pickup devices of the apparatus shown in FIG. 2.
Figures 5, 5B:
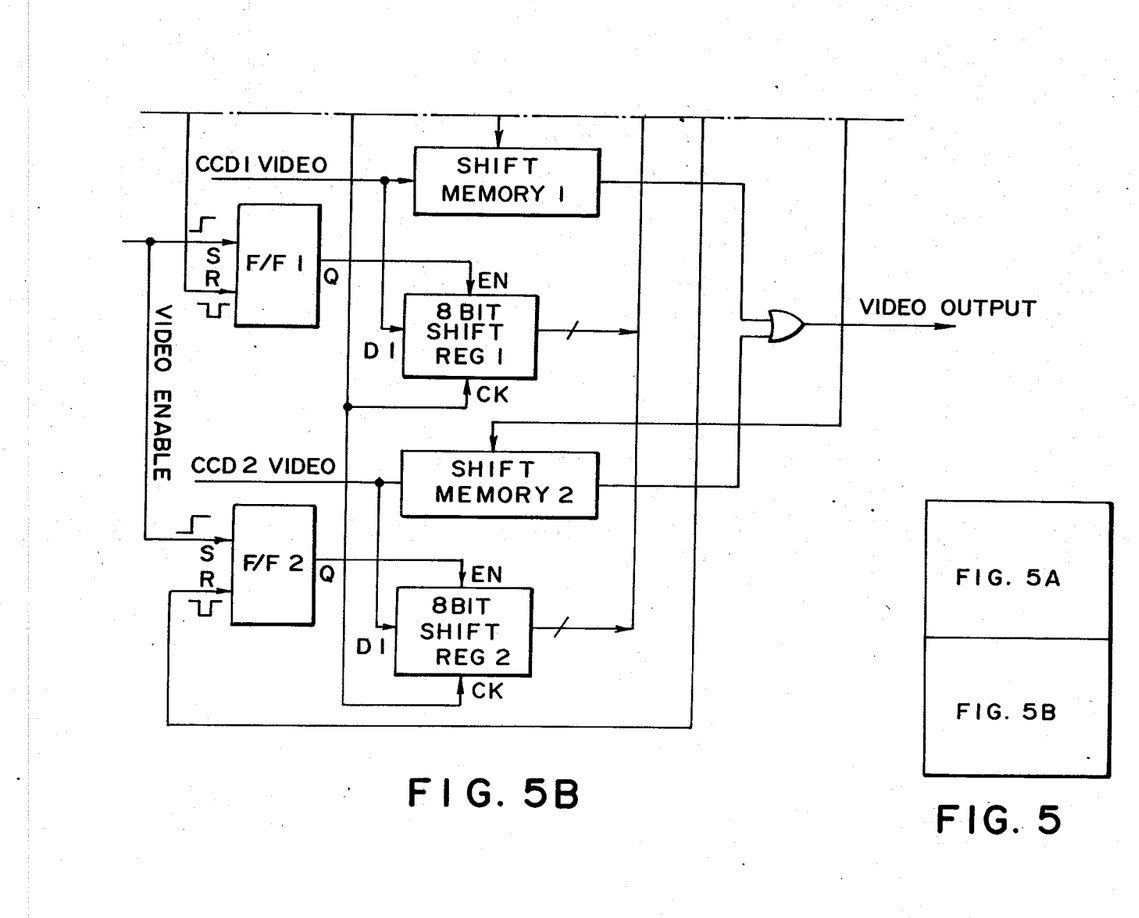
FIGS. 5, 5(A) and 5(B) are block diagrams of a linking circuit for linking the outputs from the image pickup devices of the apparatus shown in FIG. 2.
Figure 5A:
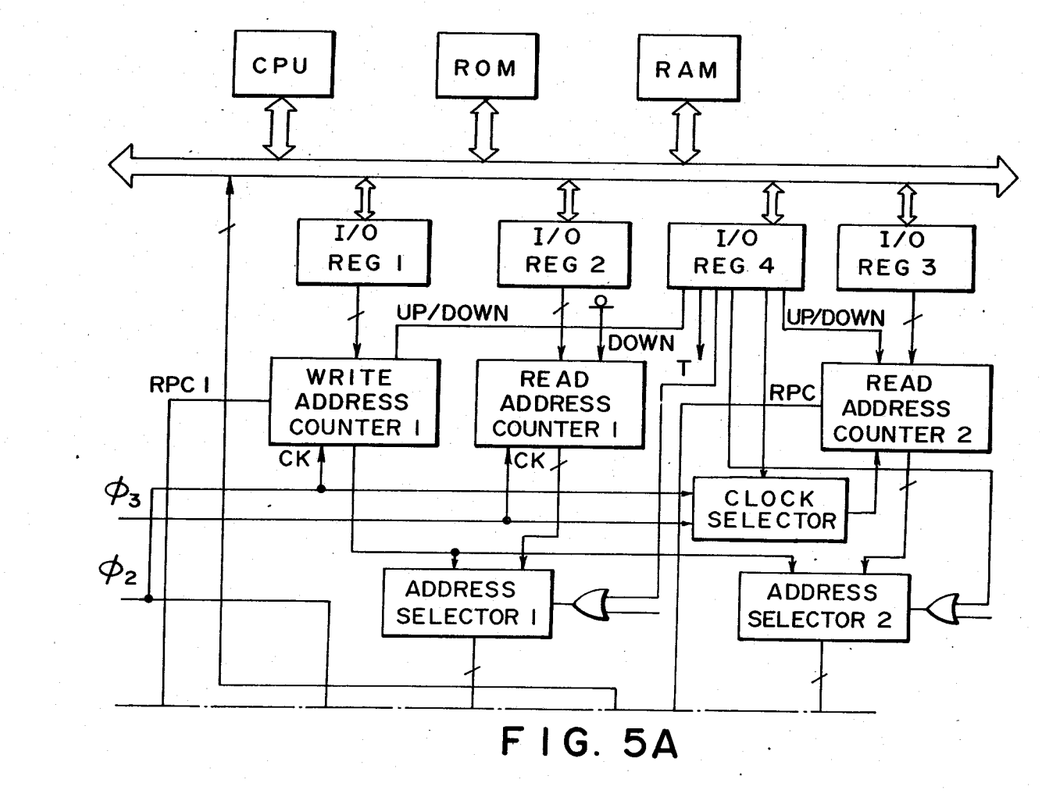

Linking processing of the outputs from a plurality of image pickup devices will now be described with reference to FIGS. 4 to 6. Means for performing automatic linking operation of the output signal from the image sensors CCD1 and CCD2 will now be described. Referring to FIG. 3, as an output from the image sensor CCD1 is stored in a shift memory 1, an output from the image sensor CCD2 is stored in a shift memory 2 (FIG. 5). FIG. 4 shows the principle of linking processing, in which FIG. 4a shows a scanning region of the image sensor CCD1, and FIG. 4b shows the scanning region of the image sensor CCD2. The scanning direction is indicated by Y. The scanning direction Y corresponds to the scanning direction Y shown in FIGS. 1(B) and 2(B). FIG. 4c shows the last 128 bits of a bit-serial signal from the image sensor CCD1 and FIG. 4d shows the first 128 bits of a bit-serial signal from the image sensor CCD2 when the light source unit 5 is at the first or second home position 23 or 24 and the portion including the marker portion 4 is irradiated with light. Note that 128 bits correspond to a width of 8 mm of the original, with a 16 bit/mm resolution. The last and first 128 bits, respectively, of the bit-serial signals from the image sensor CCD1 and CCD2 are extracted therefrom and are developed in the RAM 33. FIGS. 4e and 4f show this state. When the region scanned by two optical systems is set, white bits sandwich therebetween the 128 bits developed in the RAM 33, that is, black bits corresponding to the marker portion 4. A lower white bit number (L.W.) of the output from the image sensor CCD1, an upper white bit number (U.W.) of the output from the image sensor CCD2, and a black bit number (B) are respectively detected. The total number of these bits is subtracted from the signal obtained from the shift memory so as to remove the overlap image signals and to perform linking, thereby providing a continuous signal of the outputs from the image sensors CCD1 and CCD2.

FIG. 5 is a block diagram of a linking circuit for executing the operation as described above. The mode of operation for extracting the last 128 bits from a 2,592-bit output signal from the image sensor CCD1 and the first 128 bits from a 2,592-bit output signal from the image sensor CCD2 will now be described with reference to FIG. 5. The basic extraction operation involves 16 extraction operations in units of 8 bits, and development of the extracted data in the RAM 33. This apparatus operates in response to a write clock signal $\phi 2$ and a read clock signal $\phi 3$. First, a central processing unit (to be referred to as a CPU hereinafter) sets a write address counter 1 and a read address counter 1 in the down count mode. Note that the read address counter 1 is normally set in the down count mode. Address 2592 (A20 H in hexadecimal notation)is set in an I/O register 1 as a count value of the write address counter 1. Address 8 (8 H in hexadecimal notation) is set in an I/O register 3 as a count value of a read address counter 2. When the CPU initializes a test terminal T of an I/O register 4, a video enable signal (EN in FIG. 6) representing one main scanning period is generated by a reading circuit (not shown). In addition to this, bit-serial signals from the image sensors CCD1 and CCD2 are produced in synchronism with the write clock signal $\phi 2$.

At this time, a clock selector for selecting the pulse to be applied to the read address counter 2 selects the clock signal $\phi 2$, and the count value from the write address counter 1 is selectively supplied to two shift memories 1 and 2 by address selectors 1 and 2.

The video enable signal EN is supplied to set terminals S of flip-flops 1 and 2 shown in FIG. 5. A video signal from the image sensor CCD1 is supplied to the shift memory 1 (corresponding to the shift memory 41 shown in FIG. 3) and to an 8-bit shift register 1, and a video signal from the image sensor CCD2 is supplied to the shift memory 2 and to an 8-bit shift register 2. When the video enable signals are actuated, the 8-bit shift registers 1 and 2 start operating. The 8-bit shift registers 1 and 2 complete their operations and hold the current 8-bit data in response to count complete signals RPC1 and RPC2 from the write and read address counters 1 and 2, respectively. This operation is performed in accordacne with the output from the Q output terminals of the flip-flops 1 and 2.

When the test terminal T is actuated by the CPU and when the video enable signal EN ends, the last 8 bits of the signal from the image sensor CCD1 remain in the 8-bit shift register 1, and the first 8 bits of the signal from the image sensor CCD2 remain in the 8-bit shift register 2. The CPU then 8-bit parallel-reads out the contents of the 8-bit shift registers 1 and 2 and develops them in the RAM. In order to process the next 8 bits, address (2592−8) is set in the I/O register 1, and address (8+8) is set in an I/O register 3 so as to perform a similar processing to that described above. Sixteen such operations are repeated so as to extract 128 bits.

The CPU then detects the bit numbers L.W., U.W. and B from the 128-bit signals thus stored in the RAM, and adds the detected bit numbers together to obtain a linking amount.

When calculation of the linking amount is completed, the original is scanned. However, prior to this, the CPU sets address 2592 in the I/O register 1, address 2504 in the I/O register 2, and (2592-linking amount) in the I/O register 3. Simultaneously, the CPU sets the write and read address counters 1 and 2 in the down mode. FIGS. 4g and 4h show this state. FIG. 4g shows an output from the image sensor CCD1, which consists of a total of 2,592 bits comprising 88 bits corresponding to the margin, 2,376 bits corresponding to the information for a width of 148.5 mm, and 128 bits for linking processing. FIG. 4h shows an output from the image sensor CCD2, which similarly consists of a total of 2,592 bits. The first data CON represents the linking amount.

When scanning of the original is started, the video signals produced from the image sensors CCD1 and CCD2 are supplied to the shift memories 1 and 2, respectively, in synchronism with the write clock signal $\phi 2$. At this time, the sequentially produced 1-line video signals supplied are stored at the addresses of the shift memories 1 and 2, which decrease in unitary decrements from address 2592 in accordance with address control of the write address counter 1.

After the video signals of one line are stored in the shift memories 1 and 2, the CPU sets the address selectors 1 and 2 so as to select the addresses from the read address counters 1 and 2. The read address counter 1 which is counting down from address 2504 is driven in response to a read clock signal $\phi 3$. Then, the video signals stored from address 2504 to address 1 of the shift memory 1 are produced through a serial OR gate.

When readout of the signals from the shift memory 1 is completed, the CPU immediately drives the read address counter 2, which is counting down from address (2592-linking amount), in response to a read clock signal $\phi 3$. Then, the video signals stored from address (2592-linking amount) to address 1 of the shift memory 2 are produced through the OR gate immediately following the video signals from the shift memory 1.

Figure 6:
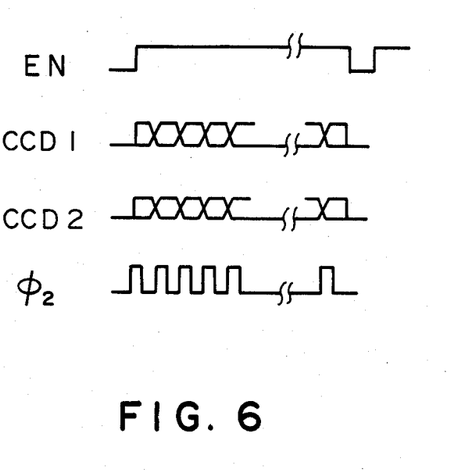
FIG. 6 is a timing chart for explaining the operation of the linking circuit of the apparatus shown in FIG. 2.

FIG. 6 shows the timing charts of the video enable signal EN, the output signal CCD1 from the image sensor CCD1, the output signal CCD2 from the image sensor CCD2, and the write clock signal $\phi 2$. Note that the I/O register 4 in FIG. 5 performs, in addition to the operation as described above, mode selection between the write address counter 1 and the read address counter 2, selection between the address selectors 1 and 2, and so on. The CPU shown in FIG. 5 controls the shading correction circuit shown in FIG. 3, and the RAM and ROM shown in FIG. 5 may commonly comprise those shown in FIG. 3.

The above embodiment has been described with reference to the case wherein the present invention is applied to an image reading apparatus of the stationary original/moving light source type. However, the present invention may be similarly applied to an image reading apparatus of the moving original/stationary light source type. Furthermore, transmitted light may be utilized in place of reflected light. The number of image pickup devices need not be 2 and may be 3 or more.

According to an image reading apparatus having a plurality of image pickup devices and the configuration and function as described above, shading correction, linking of outputs from the plurality of image pickup devices, and scanning for reading information from an original or the like may be reliably performed by relative movement between the light source and the original, thus improving the operability of the apparatus.

Furthermore, shading correction may be performed first. Then, calculation of the linking amount is performed on the basis of the signals which have been subjected to shading correction, so that an error in linking attributable to the shading characteristics may be prevented and operating precision of an image reading apparatus of the type described above may be improved.

When linking is performed, in place of a so-called dither pattern suitable for halftone image reproduction, a constant threshold value is produced from the dither ROM 39 and is supplied to the comparator 40. Thus, linking may be performed with still higher precision.

In the embodiments described above with reference to FIGS. 1 and 2, the scanning position of the light source unit 5 is different during shading correction and linking. According to this position, the two processing operations may be performed with high precision.

However, the light source unit 5 must have two home positions. Furthermore, scanning of the original must also be performed independently of these processing operations.

It is therefore conceivable to perform shading correction and linking using a common home position. However, when this method is adopted, the reading signal at the marker position for linking may adversely affect shading correction.

An image reading apparatus of a third embodiment of the present invention will now be described wherein shading correction and linking are performed using a common home position or a reference board reading and the above-mentioned problem is eliminated. Since linking after shading correction according to the third embodiment is basically the same as that of the embodiment shown in FIG. 5, a description thereof will be omitted.

Figure 7A:
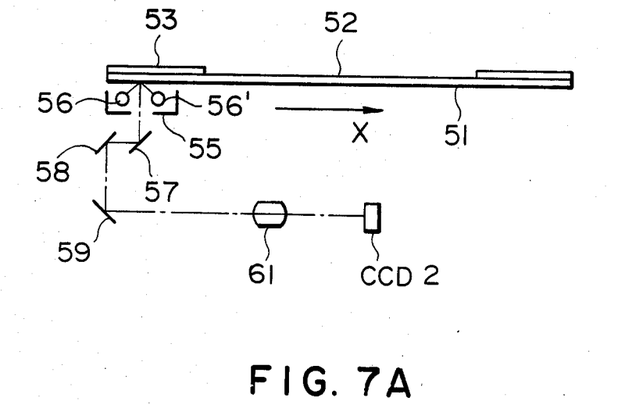
FIG. 7(A) is a side view of an image reading apparatus according to a third embodiment of the present invention.
Figure 7B:
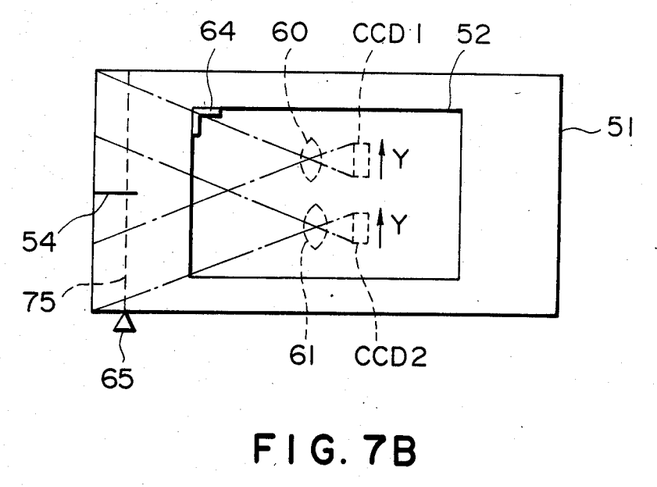
FIG. 7(B) is a plan view of the same.

FIG. 7(A) is a side view showing the optical configuration of the apparatus of the third embodiment, and FIG. 7(B) is a plan view of the same. Referring to these figures, an original table 51 has a main scanning region 52. A reference optical characteristic portion 53 is either fixed or movably mounted on the original table 51, or is placed at a predetermined position thereof. The reference optical characteristic portion 53 and a marker portion 54 to be described later are together called an arrangement. The surface of the reference optical characteristic portion 53 which faces the original table 51 is a white board, as in FIGS. 1 and 2. The position of the reference optical characteristic portion 53 corresponds to a home position 75 (stationary position) of a light source unit 55. The characteristics of the reference optical characteristic portion 53 which influence the reflected light therefrom, such as hue, reflectance, or surface smoothness, provide a reference for shading correction. The marker portion 54 is arranged at the reference optical characteristic portion 53. Light from the light source unit 5 and reflected by the marker portion 54 provides signals for linking. In this embodiment, the portion of the marker 54 which is in contact with the original table 51 comprises a thin black line of a predetermined width. The position of the marker portion 54 is determined so that it may be scanned by two adjacent optical systems including lenses 60 and 61.

The light source unit 55 includes rod-shaped light sources 56 and 56'. At the home position 75, the light source unit 55 simultaneously irradiates the entire region of the reference optical characteristic portion 53 in the main scanning direction (indicated by the broken line in FIG. 7(B)) and the marker portion 54. Then, the light source unit 55 moves in the subscanning direction (direction X in FIG. 7(A)) so as to scan an original on the main scanning region 52. Reflectors 57, 58 and 59 (omitted in FIG. 7(B)) move so that the optical paths from the light source unit 55 to the lenses 60 and 61 are kept constant. More specifically, the reflector 57 moves together with the light source unit 55, while the reflectors 58 and 59 move for a distance having a predetermined ratio to the distance moved by the light source unit 5 so as to satisfy the above condition. The lenses 60 and 61 are imaging lenses. When the reference optical characteristic portion 53, the marker portion 54, and the original on the main scanning region 52 are irradiated with light from the light source unit 55, reflected light is focused on the light-receiving surfaces of image pickup devices through the reflectors 57 to 59. Solid-state image sensors CCD1 and CCD2 are image pickup devices and may comprise charge-coupled devices, MOS transistors or the like. The image sensors CCD1 and CCD2 electrically scan in the main scanning direction.

Referring to FIG. 7(B), a reference mark 64 provides a reference for placement of an original on the original table 51. A sensor 65 detects the home position 75 of the light source unit 55. The position of the light source unit 55 is adjusted through a control mechanism (not shown) in accordance with an output from the sensor 65.

The mode of operation of the apparatus shown in FIG. 7 will now be described. When the light source unit 55 is at its home position 75 and irradiates the reference optical characteristic portion 53, the marker portion 54 is also irradiated with light. Reflected light is received by the image sensors CCD1 and CCD2 through the reflectors 57 to 59 and the imaging lenses 60 and 61. Thus, the signals obtained from the image sensors CCD1 and CCD2 which indicate the shading characteristics include information of the reflected light from the marker portion 54. In this embodiment, the signal obtained in correspondence with the reflected light from the marker portion 54 is replaced by a signal corresponding to portions other than this marker portion; in particular, by a signal obtained corresponding to a portion immediately preceding the marker portion 54. Thus, the adverse effect of the marker portion 54 on shading correction may be prevented. This will be described in detail with reference to FIG. 8. After shading correction and linking are completed, the light source unit 55 moves to the main scanning region 52 where it scans in the subscanning direction (X direction) in FIG. 7(A), thereby scanning the original in the main scanning direction and in the subscanning direction. Read signals of the original are produced from the image sensors CCD1 and CCD2 and are subjected to shading correction by the circuit shown in FIG. 8, to be described later, and to linking by the circuit shown in FIG. 5. When scanning of the original is completed, the light source unit 55 returns to its home position 75.

Figures 8, 8B:
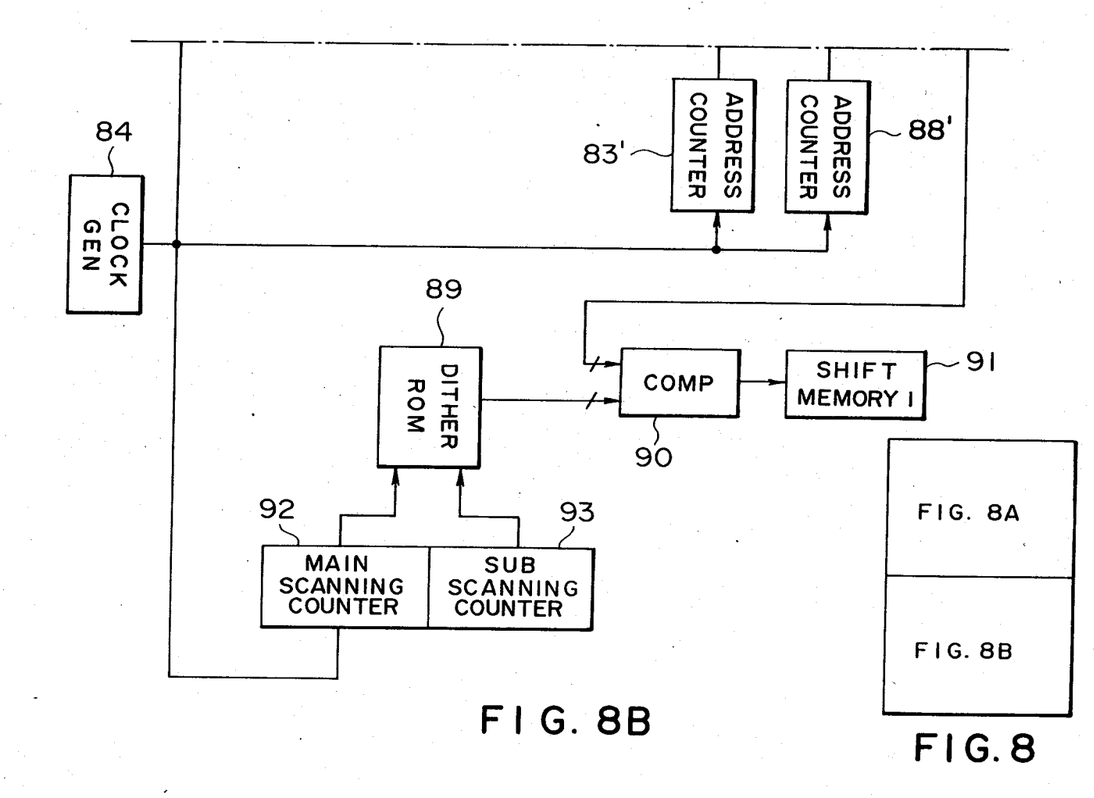
FIGS. 8, 8(A) and 8(B) are a block diagrams of a shading correction circuit of the apparatus shown in FIG. 7.
Figure 8A:
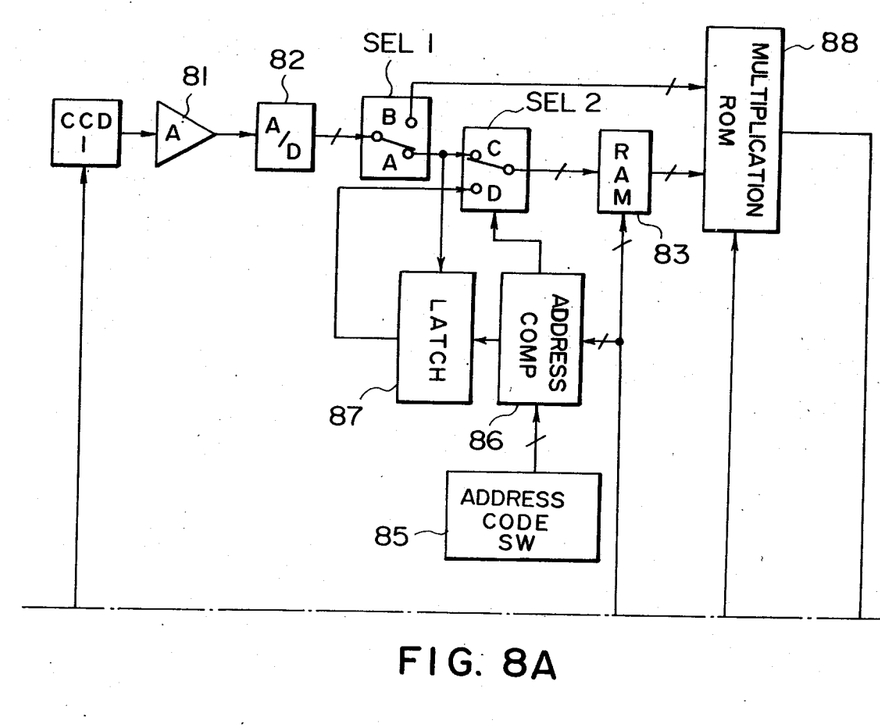

An example of shading correction in this embodiment will now be described with reference to FIG. 8. FIG. 8 shows the circuit which replaces the signal corresponding to reflected light from the marker portion 54 and included in the signal representing the shading characteristics with an immediately preceding signal. FIG. 8 shows only the circuit for processing the signal produced from the image sensor CCD1. Assume that scanning is performed in the Y direction shown in FIG. 7(B), that is, in the direction from an original reference mark 64 toward the center of the original. In this case, the signal corresponding to the marker portion 54 appears in the latter half cycle of the main scanning cycle. A similar circuit is also provided to process the output signal from the image sensor CCD2. In this case, the signal corresponding to the marker portion 54 appears in the former half cycle of the main scanning cycle.

FIG. 8 shows the circuit in the initial period of shading correction, wherein a selector SEL1 is switched to the side of a contact A, while a selector SEL2 is switched to the side of a contact C. A bit-serial image signal from the image sensor CCD1 is amplified by an amplifier 81, and an output signal therefrom is converted into a digital signal by an A/D converter 82. The digital signal from the A/D converter 82 is written in a random-access memory (to be referred to as a RAM hereinafter) 83. Address control of the RAM 83 is performed by an address counter 83' in accordance with a clock signal synchronous with a clock signal from a clock generator 84 corresponding to the image sensor CCD1. This address signal is compared by an address comparator 86 with an address code from an address code swich 85 in which an address corresponding to a portion immediately preceding the marker portion 54 is written. When the two addresses coincide with each other, the comparator 86 switches the selector SEL2 to the side of a contact D and causes a latch 87 to hold its current digital value. The value held by the latch 87 is written in the RAM 83 until the main scanning cycle is completed.

Following the shading sequence as described above, the light source unit 55 at its home position irradiates the reference optical characteristic portion 53 to execute linking, and subsequently scans the original. In order to perform linking, the selector SEL1 is switched to the side of a contact B. Image data of the marker portion 54 and the original is supplied to one input of a multiplication read-only memory 88 (to be referred to as a ROM hereinafter). The other input of the multiplication ROM 88 receives a signal from the RAM 83 which includes the shading value obtained in the shading sequence as described above. Address control of the multiplication ROM 88 is performed through an address counter 88' in accordance with a signal synchronous with a clock signal from the clock generator 84. When an input from the RAM 83 is n and the image data is m, the multiplication ROM 88 produces a code m/n using these values m and n as addresses. Shading correction is performed in accordance with this output. An output from the multiplication ROM 88 is supplied to a comparator 90 and is compared with an output from a dither ROM 89. Binary image data from the comparator 90 is supplied to a shift memory 1 (91). A signal synchronous with a clock signal from the clock generator 84 is supplied to a main scanning counter 92. Every time the count of the main scanning counter 92 reaches a predetermined value, a count pulse is supplied to a subscanning counter 93 for synchronizing address control with the light source unit 55. The signal corresponding to the marker portion 54 is utilized by the linking circuit shown in FIG. 5.

With the apparatus shown in FIG. 8, in the shading sequence, the signal corresponding to the marker portion 54 for linking the outputs from a plurality of image sensors is replaced by an immediately preceding signal. Accordingly, the adverse effect of the marker portion 54 on shading correction may be eliminated with a simple circuit configuration. If reading of the shading characteristics and reading of the marker portion 54 are performed at different positions, when the light source unit 55 irradiates the reference optical characteristic portion 53, reflected light from the marker 54 may not be picked up by the image sensors CCD1 and CCD2 and the marker portion 54 must be separately irradiated with light. In this case, position control of the light source unit 55 becomes complex in procedure. However, the apparatus shown in FIG. 8 simplifies position control of the light source unit 55 since shading correction and linking may be performed with the light source unit 55 being at a single home position. The signal corresponding to the marker portion 54 may be replaced by a signal immediately following the marker portion 54 in place of the immediately preceding signal.

In this manner, in an image reading apparatus having a plurality of image pickup devices, shading correction and linking are performed with a light source unit being at a single home position. Accordingly, the adverse effect on shading correction of the marker portion for linking output signals from a plurality of image pickup elements may be eliminated.

What I claim is:

1. An image reading apparatus comprising:
    a plurality of image pickup devices arranged in a main scanning direction;
    means for correcting a variation in output of each of said plurality of image pickup devices, said variation being due to the shading characteristic of the associated one of said image pickup devices;
    means for detecting an overlap reading region of said plurality of image pickup devices in accordance with outputs from said plurality of image pickup devices which are supplied after being subjected to correction of the variations therein; and
    removing means for removing overlapped image data corresponding to the overlap reading region detected by said detecting means from image data obtained when said plurality of image pickup devices read an image of an original document on a share basis.

2. An apparatus according to claim 1, wherein said correcting means performs the correction in accordance with signals obtained by means of reading a reference optical characteristic portion with said plurality of image pickup devices.

3. An apparatus according to claim 1, wherein said detecting means detects the overlap reading region in accordance with signals obtained by reading a reference marker with said plurality of image pickup devices.

4. An apparatus according to claim 1, wherein said removing means includes a plurality of memory means each storing image data read out by the associated one of said plurality of image pickup devices, and removes the overlapped image data upon control of access of said plurality of memory means.

5. An apparatus according to claim 1, further comprising means for converting the outputs from said plurality of image pickup devices into digital signals.

6. An apparatus according to claim 1, wherein said correcting means comprises memory means for storing a signal representing a shading characteristic which is produced from each of said plurality of image pickup devices, and storage means for producing a corrected image signal which is previously stored therein in accordance with a combination of an image reading signal from said image pickup devices and a signal read out from said memory means.

7. An image reading apparatus comprising:
    a plurality of image pickup devices arranged in a main scanning direction;
    a reference optical characteristic portion used for detecting a variation in output of each of said plurality of image pickup devices, said variation being due to the shading characteristic of the associated one of said image pickup devices, and said reference optical characteristic portion having a marker used for detecting an overlap reading region of said plurality of image pickup devices;
    replacing means for replacing a signal, included in output signals corresponding to said reference optical characteristic portion from said plurality of image pickup devices, and which corresponds to said marker, with an output signal corresponding to a portion other than said marker portion;

first detecting means for detecting the overlap reading region in accordance with output signals obtained by reading said marker from said plurality of image pickup devices;

second detecting means for detecting the variation in accordance with output signals obtained by reading said reference optical characteristic portion therewith and including the output signal replaced by said replacing means;

means for correcting the variation of outputs from said plurality of image pickup devices in accordance with the variation detected by said second detecting means; and removing means for removing overlapped image data corresponding to the overlap reading region detected by said first detecting means from image data obtained when said plurality of image pickup devices read an image of an original document on a share basis.

8. An apparatus according to claim 7, wherein said replacing means replaces the signal corresponding to said marker with a signal corresponding to a portion which is already read.

9. An apparatus according to claim 7, wherein said removing means includes a plurality of memory means each storing image data read out by the associated one of said plurality of image pickup devices, and removes the overlapped image data upon control of access of said plurality of memory means.

10. An apparatus according to claim 7, further comprising means for converting the outputs from said plurality of image pickup devices into digital signals.

11. An apparatus according to claim 7, wherein said correcting means comprises memory means for storing a signal representing the variation detected by said detecting means, and storage means for producing a corrected image signal which is previously stored therein in accordance with a combination of image data from said image pickup devices and a signal read out from said memory means.

12. An image reading apparatus comprising:
reading means for photoelectrically reading an image;
means for correcting a variation in an image signal output of said reading means, said variation being due to the shading characteristic thereof;
means for converting the image signal corrected by said correcting means into a binary signal, said converting means comprising means for comparing the image signal with threshold values for halftone image reproduction read out from a memory; and
memory means for storing the image signal in a form of a binary signal.

13. An apparatus according to claim 12, wherein said reading means reads the image in units of lines, and said memory means stores the image signal of one line.

14. An apparatus according to claim 13, wherein said memory means comprises a plurality of memory areas which can divide the image signal of one line and separately store parts of the divided image signal.

15. An apparatus according to claim 12, wherein said correcting means performs the correction in accordance with signals obtained by reading a reference optical characteristic portion with said reading means.

16. An image reading apparatus comprising:
a plurality of image pickup devices arranged in a main scanning direction;
first reference portion used for detecting a variation in output from each of said plurality of image pickup devices, said variations being due to the shading characteristic of the associated one of said image pickup devices;
second reference portion used for detecting an overlap reading region of said plurality of image pickup devices;
first detecting means for detecting the variation in accordance with output signals corresponding to said first reference portion;
means for correcting the variation of outputs from said plurality of image pickup devices in accordance with the variation detected by said first detecting means;
second detecting means for detecting an overlap reading region in accordance with output signals corresponding to said second reference portion from said plurality of image pickup devices, said signals being supplied after being subjected to correction of the variation therein; and
removing means for removing overlapped image data corresponding to the overlap reading region detected by said second detecting means from image data obtained when said plurality of image pickup devices read an image of an original document on a share basis.

17. An apparatus according to claim 16, wherein said removing means includes a plurality of memory means each storing image data read out by the associated one of said plurality of image pickup devices, and removes the overlapped image data upon control of access of said plurality of memory means.

18. An apparatus according to claim 16, wherein said first reference portion and said second reference portion are disposed on mutually different positions.

19. An apparatus according to claim 16, further comprising means for converting the outputs from said plurality of image pickup devices into digital signals.

* * * * *

UNITED STATES PATENT AND TRADEMARK OFFICE
CERTIFICATE OF CORRECTION

PATENT NO. : 4,675,533

DATED : June 23, 1987

INVENTOR(S) : KATSUICHI SHIMIZU

It is certified that error appears in the above-identified patent and that said Letters Patent is hereby corrected as shown below:

COLUMN 2

Line 46, delete "a" (first occurrence).

COLUMN 3

Line 64, "1(B)." should read --1(B)).--.

COLUMN 5

Line 48, "writtern" should read --written--.

COLUMN 7

Line 33, "cordacne" should read --cordance--.

COLUMN 9

Line 39, "5" should read --55--.
Line 61, "5" should read --55--.

COLUMN 11

Line 5, "swich" should read --switch--.

UNITED STATES PATENT AND TRADEMARK OFFICE
CERTIFICATE OF CORRECTION

PATENT NO. : 4,675,533

DATED : June 23, 1987

INVENTOR(S) : KATSUICHI SHIMIZU

It is certified that error appears in the above-identified patent and that said Letters Patent is hereby corrected as shown below:

COLUMN 14

Line 4, "claim 13," should read --claim 12,--.

Signed and Sealed this

Seventeenth Day of May, 1988

Attest:

DONALD J. QUIGG

Attesting Officer     Commissioner of Patents and Trademarks